US012568413B2

(12) United States Patent
Yadav et al.

(10) Patent No.: US 12,568,413 B2
(45) Date of Patent: Mar. 3, 2026

(54) METHOD TO REDUCE PGW INITIATED GTPC SIGNALING DURING S1-HANDOVER WITH SGW RELOCATION

(71) Applicant: Parallel Wireless, Inc., Nashua, NH (US)

(72) Inventors: Prerana Yadav, Pune (IN); Ganesh Jaju, Pune (IN); Ketan Parikh, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 689 days.

(21) Appl. No.: 17/721,824

(22) Filed: Apr. 15, 2022

(65) Prior Publication Data

US 2022/0338078 A1 Oct. 20, 2022

Related U.S. Application Data

(60) Provisional application No. 63/175,623, filed on Apr. 16, 2021.

(51) Int. Cl.
*H04W 36/02* (2009.01)
*H04W 76/12* (2018.01)

(52) U.S. Cl.
CPC ........... *H04W 36/02* (2013.01); *H04W 76/12* (2018.02)

(58) Field of Classification Search
CPC .............................. H04W 76/12; H04W 36/02
See application file for complete search history.

(56) References Cited

U.S. PATENT DOCUMENTS

2008/0117862 A1    5/2008  Yeshayahu et al.
2015/0124585 A1*   5/2015  Sahin .................... H04W 36/12
                                                            370/218
2018/0295659 A1*  10/2018  Shan ...................... H04W 4/24

* cited by examiner

*Primary Examiner* — Sulaiman Nooristany
(74) *Attorney, Agent, or Firm* — Michael Y. Saji; Ashish Patel

(57) ABSTRACT

A method, system and computer readable media for reducing Packet Gateway (PGW) initiated signaling with a Serving Gateway (SGW) is presented. In one example embodiment a method for reducing Packet Gateway (PGW) initiated signaling with a Serving Gateway (SGW), includes determining by the PGW that a Packet Data Network (PDN) is undergoing S1-handover with the SGW-relocation; buffering, by the PGW, bearer procedure messages and starting a guard timer; and re-attempting the buffered messages until a condition has been met.

17 Claims, 6 Drawing Sheets

300

Determining by the PGW that a Packet Data Network (PDN) is undergoing S1-handover with the SGW-relocation — 301

The PGW initiated signaling with the SGW is General Packet Radio Service (GPRS) Tunneling Protocol Control (GTPC) signaling — 302

A target SGW is part of a same System Architecture Evolution Gateway (SAEGW) — 303

Buffering, by the PGW, bearer procedure messages and starting a guard timer — 304

Re-attempting the buffered messages until a condition has been met — 305

The condition comprises determining the S1-handover is completed or determining the guard timer has expired — 306

Initiating, by the PGW, signaling during S1-handover — 307

Buffering, by the PGW, bearer procedures that are required to be initiated for a PDN of that User Equipment — 308

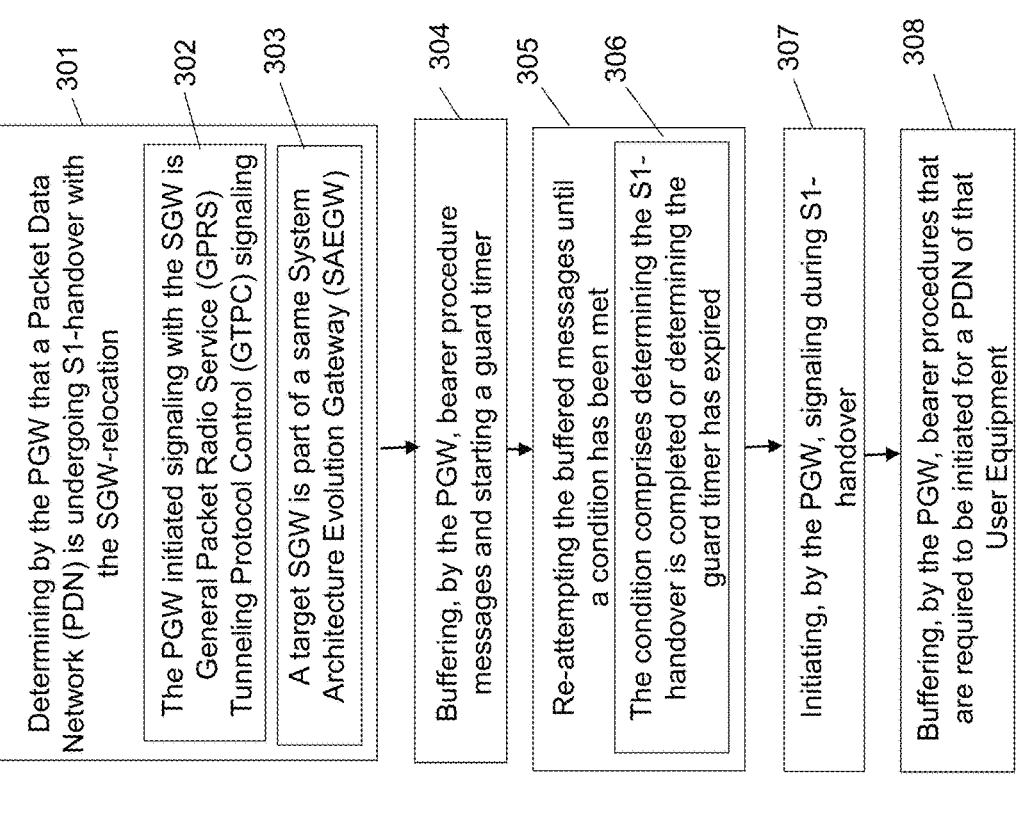

FIG. 3

301 — Determining by the PGW that a Packet Data Network (PDN) is undergoing S1-handover with the SGW-relocation 302 — The PGW initiated signaling with the SGW is General Packet Radio Service (GPRS) Tunneling Protocol Control (GTPC) signaling 303 — A target SGW is part of a same System Architecture Evolution Gateway (SAEGW)

304 — Buffering, by the PGW, bearer procedure messages and starting a guard timer 305 — Re-attempting the buffered messages until a condition has been met 306 — The condition comprises determining the S1-handover is completed or determining the guard timer has expired 307 — Initiating, by the PGW, signaling during S1-handover 308 — Buffering, by the PGW, bearer procedures that are required to be initiated for a PDN of that User Equipment

300

METHOD TO REDUCE PGW INITIATED GTPC SIGNALING DURING S1-HANDOVER WITH SGW RELOCATION

CROSS-REFERENCE TO RELATED APPLICATIONS

This application claims priority under 35 U.S.C. § 119(e) to U.S. Provisional Pat. App. No. 63/175,623, filed Apr. 16, 2021, titled "Method to Reduce PGW Initiated GTPC Signaling During S1-Handover With SGW Relocation" which is hereby incorporated by reference in its entirety for all purposes. This application also hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety.

BACKGROUND

Existing approach as defined by 3GPP spec 23.401 Sec. 5.5.1.2.1 S1-based handover General Rel 15. The S1-based handover procedure is used when the X2-based handover cannot be used. The source eNodeB initiates a handover by sending Handover Required message over the S1-MME reference point. This procedure may relocate the MME and/or the Serving GW. The source MME selects the target MME. The MME should not be relocated during inter-eNodeB handover unless the UE leaves the MME Pool Area where the UE is served. The MME (target MME for MME relocation) determines if the Serving GW needs to be relocated. If the Serving GW needs to be relocated the MME selects the target Serving GW, as specified in clause 4.3.8.2 on Serving GW selection function.

The source eNodeB decides which of the EPS bearers are subject for forwarding of downlink and optionally also uplink data packets from the source eNodeB to the target eNodeB. The EPC does not change the decisions taken by the RAN node. Packet forwarding can take place either directly from the source eNodeB to the target eNodeB, or indirectly from the source eNodeB to the target eNodeB via the source and target Serving GWs (or if the Serving GW is not relocated, only the single Serving GW).

The availability of a direct forwarding path is determined in the source eNodeB and indicated to the source MME. If X2 connectivity is available between the source and target eNodeBs, a direct forwarding path is available. If a direct forwarding path is not available, indirect forwarding may be used. The source MME uses the indication from the source eNodeB to determine whether to apply indirect forwarding. The source MME indicates to the target MME whether indirect forwarding should apply. Based on this indication, the target MME determines whether it applies indirect forwarding. If the MME receives a rejection to an S1 interface procedure (e.g. dedicated bearer establishment/modification/release; location reporting control; NAS message transfer; etc.) from the eNodeB with an indication that an S1 handover is in progress (see TS 36.300 [5]), the MME shall reattempt the same S1 interface procedure when either the handover is complete or is deemed to have failed if the MME is still the serving MME, except in case of Serving GW relocation. If the S1 handover changes the serving MME, the source MME shall terminate any other ongoing S1 interface procedures except the handover procedure.

If during the handover procedure the MME detects that the Serving GW needs be relocated, the MME shall reject any PDN GW initiated EPS bearer(s) request received since handover procedure started and shall include an indication that the request has been temporarily rejected due to handover procedure in progress.

SUMMARY

This invention provides a method to reduce GTPC signaling on S5/S8 and S11 interfaces when a PGW mode PDN undergoes S1-handover with SGW-relocation resulting in a SAEGW PDN since SGW and PGW are part of same SAEGW node.

In one embodiment a method for reducing Packet Gateway (PGW) initiated signaling with a Serving Gateway (SGW) includes determining by the PGW that a Packet Data Network (PDN) is undergoing S1-handover with the SGW-relocation, then buffering, by the PGW, bearer procedure messages and starting a guard timer; and re-attempting the buffered messages until a condition has been met.

In another example embodiment a system for reducing Packet Gateway (PGW) initiated signaling with a Serving Gateway (SGW) includes a System Architecture Evolution Gateway (SAEGW) node having a target SGW in communication with a PGW; wherein the PGW determines that a Packet Data Network (PDN) is undergoing S1-handover with the SGW-relocation, buffers bearer procedure messages and starts a guard timer; and wherein the buffered messages are attempted until a condition has been met.

In another example embodiment a non-transitory computer-readable medium contains instructions for reducing Packet Gateway (PGW) initiated signaling with a Serving Gateway (SGW) which, when executed, cause the system to perform steps comprising: determining by the PGW that a Packet Data Network (PDN) is undergoing S1-handover with the SGW-relocation, then buffering, by the PGW, bearer procedure messages and starting a guard timer; and re-attempting the buffered messages until a condition has been met.

BRIEF DESCRIPTION OF THE DRAWINGS

FIG. 3 is a flow diagram of an example method for providing reduced Packet Gateway (PGW) initiated signaling with a Serving Gateway (SGW), in accordance with some embodiments.

DETAILED DESCRIPTION

When S1-handover for an UE is in progress to a target SGW which is part of SAEGW node whose PGW is already handling some/all of the UE's PDNs, any PGW EPS bearer procedures are still forwarded to source SGW.

Figure 1:
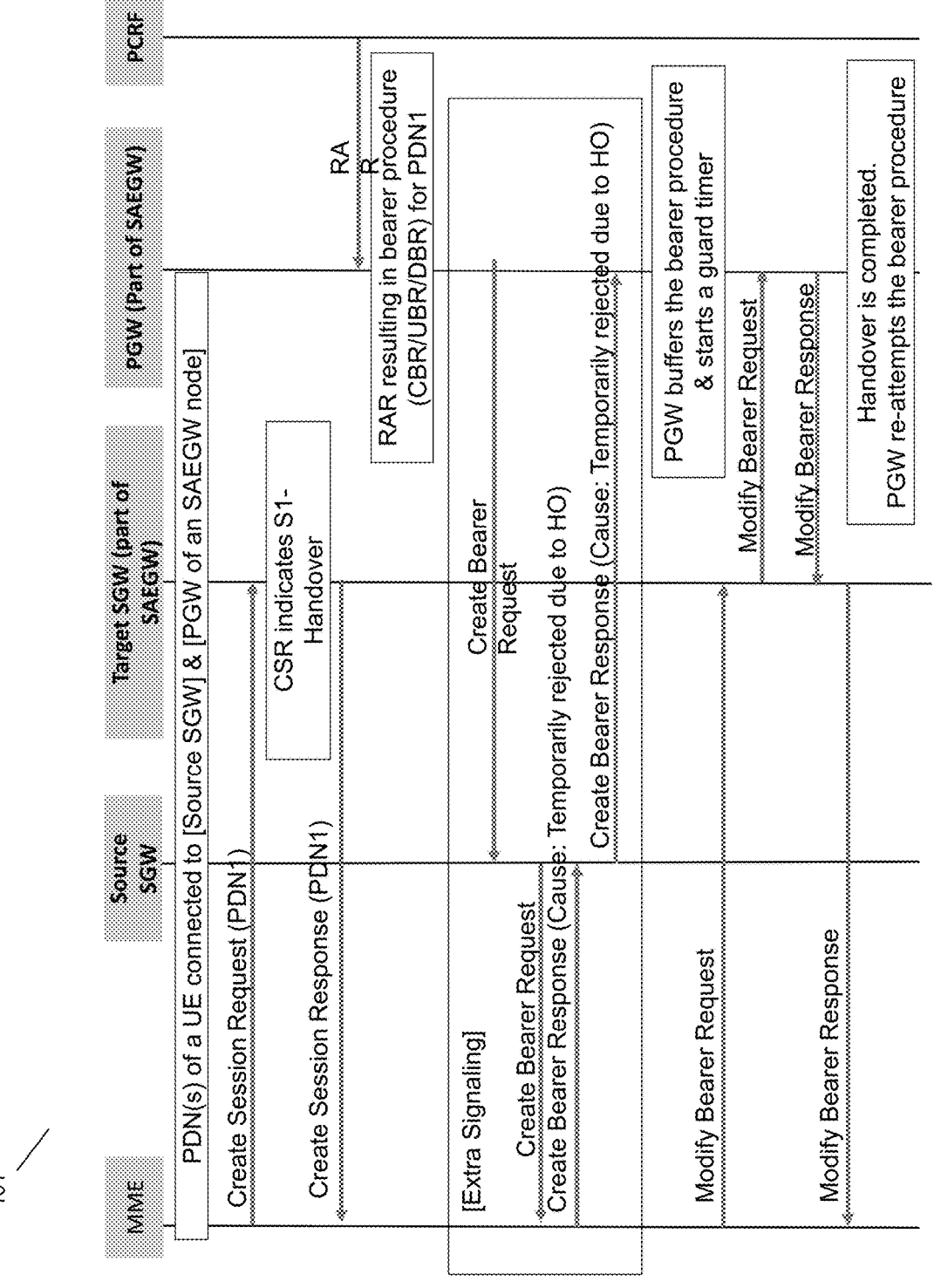
FIG. 1 is a call flow diagram showing a known way of Packet Gateway (PGW) initiated signaling with a Serving Gateway (SGW), in accordance with some embodiments.

There are two problems in the current approach, as shown in the call flow diagram 100 of FIG. 1. Although knowledge of SGW being part of same SAEGW node is present, there is unnecessary GTPC signaling between PGW and source SGW, and then source SGW and MME.

If the PDN has multiple bearers and PGW has already received "Temporarily rejected due to handover/TAU/RAU procedure in progress" cause in the GTPC response for a bearer procedure, then it still allows any further signaling on other bearers of same PDN.

Figure 2:
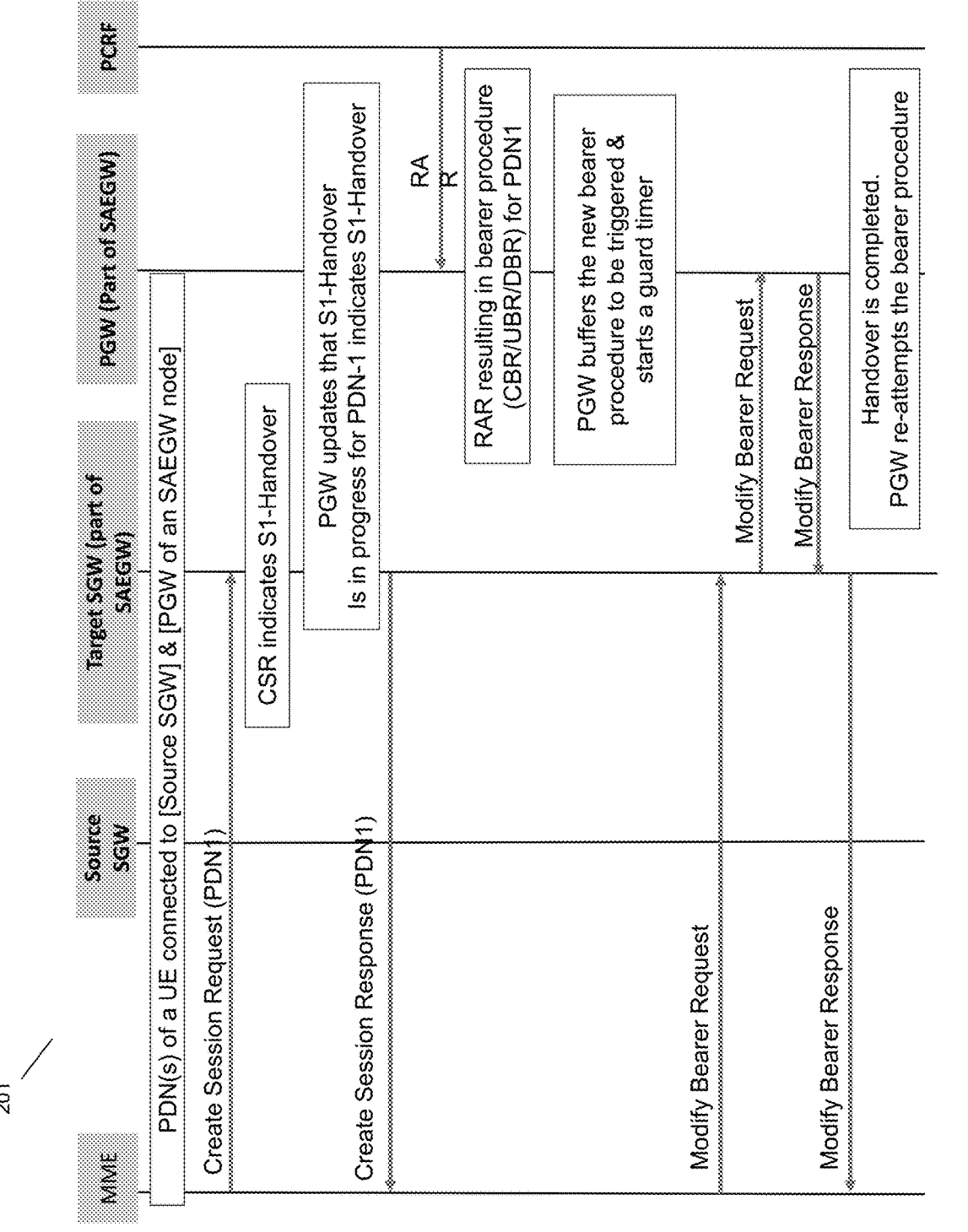
FIG. 2 is a call flow diagram showing reduced Packet Gateway (PGW) initiated signaling with a Serving Gateway (SGW), in accordance with some embodiments.

Solution to Problem is shown in the call flow diagram 201 of FIG. 2. The GTPC signaling messages on S11 and S5/S8 can be reduced for bearer procedures when PGW mode PDN is becoming SAEGW mode PDN. Below is the proposed solution to this problem.

Since PGW knows that PDN is undergoing S1-handover with SGW-relocation where target SGW is part of the same SAEGW node, if some bearer procedures are required to be initiated for a PDN of that UE, PGW shall buffer those messages and start a guard timer. These buffered messages shall be re-attempted either when the S1-handover is completed, or guard timer is expired.

This approach reduces unnecessary GTPC signaling between PGW and MME which would anyways be rejected by MME due to SGW-relocation in progress.

5G will embrace a true HetNet environment: from multiple types of access technologies, multi-layer networks, to many different devices with billions of user interactions—and not just individual users. The new users will take advantage of 5G from municipalities to verticals like energy and health, from social organizations to public safety and defense.

5G will enable new services for all these users at low cost by providing seamless and efficient communication and will significantly improve the way people interact with each other, with the final goal of improving people's lives. To do so, the 5G network won't be limited to the radio access (RAN), but will encompass the whole network, including aspects as subscriber, policy and security management, core network and transport components.

5G networks will have to support a number of services, many of them with different and almost orthogonal performance requirements.

Three major service categories defined for 5G are: Enhanced Mobile Broadband (eMBB); Massive IoT or Machine Type Communications (mMTC); and Ultra-Reliable & Low Latency Communications (URLLC).

FIG. 3A flow chart of a particular embodiment of the presently disclosed method is depicted in FIG. 3. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language or hardware implementation. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 3, an example embodiment of a method 300 for reducing Packet Gateway (PGW) initiated signaling with a Serving Gateway (SGW) begins with processing block 301 which discloses determining by the PGW that a Packet Data Network (PDN) is undergoing S1-handover with the SGW-relocation. As shown in processing block 302 the PGW initiated signaling with the SGW is General Packet Radio Service (GPRS) Tunneling Protocol Control (GTPC) signaling. As shown in processing block 303 a target SGW is part of a same System Architecture Evolution Gateway (SAEGW) node.

Processing block 304 recites buffering, by the PGW, bearer procedure messages and starting a guard timer. Processing block 305 recites re-attempting the buffered messages until a condition has been met. As shown in processing block 306 the condition comprises determining the S1-handover is completed or determining the guard timer has expired.

Processing block 307 shows initiating, by the PGW, signaling during S1-handover; and processing block 308 recites buffering, by the PGW, bearer procedures that are required to be initiated for a PDN of that User Equipment (UE).

Figure 4:
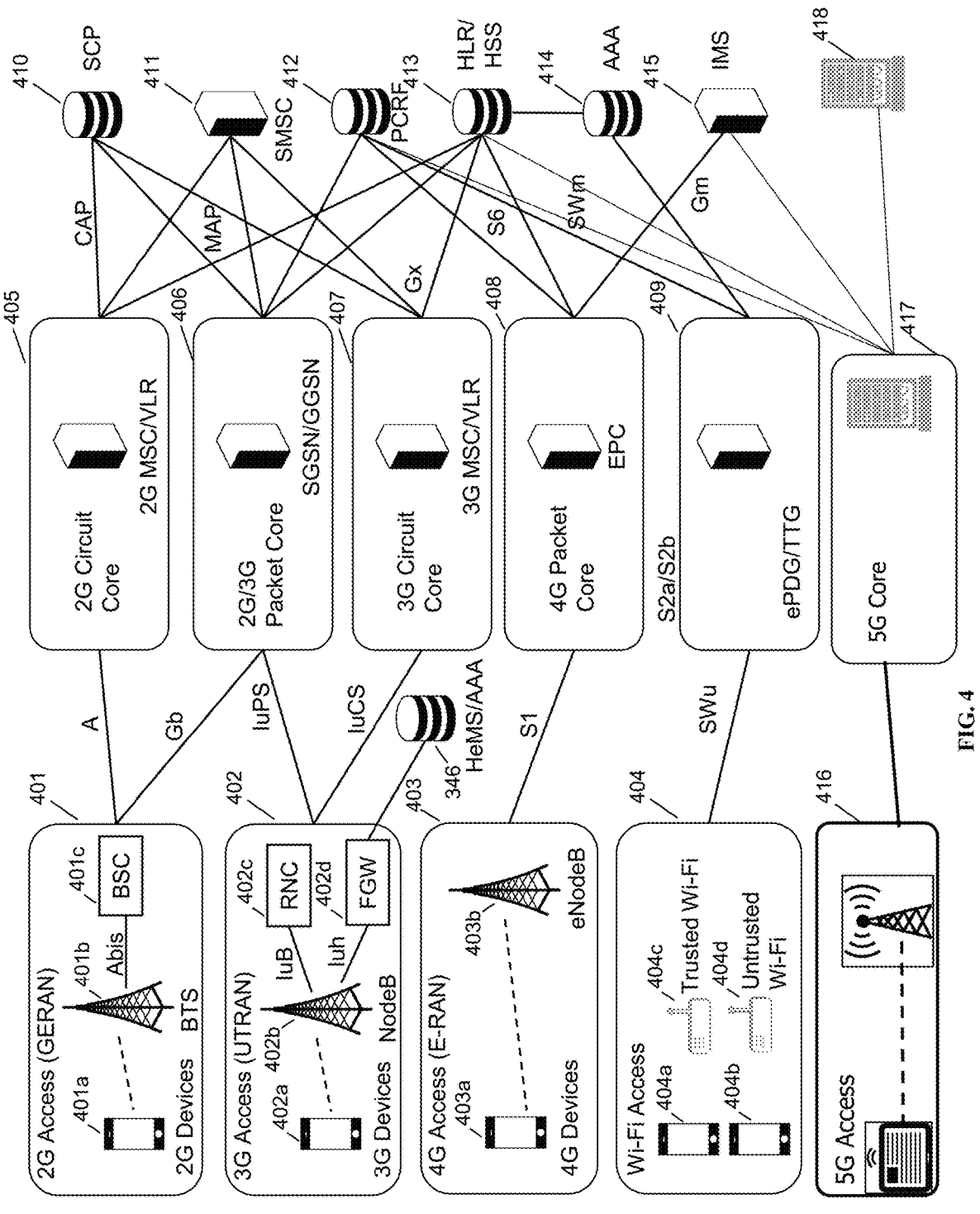
FIG. 4 is a schematic network architecture diagram for 3G and other-G prior art networks.

FIG. 4 is a schematic network architecture diagram 400 for 3G and other-G prior art networks. The diagram shows a plurality of "Gs," including 2G, 3G, 4G, 5G and Wi-Fi. 2G is represented by GERAN 401, which includes a 2G device 401a, BTS 801b, and BSC 401c. 3G is represented by UTRAN 402, which includes a 3G UE 402a, nodeB 402b, RNC 402c, and femto gateway (FGW, which in 3GPP namespace is also known as a Home nodeB Gateway or HNBGW) 402d. 4G is represented by EUTRAN or E-RAN 403, which includes an LTE UE 403a and LTE eNodeB 403b. Wi-Fi is represented by Wi-Fi access network 404, which includes a trusted Wi-Fi access point 404c and an untrusted Wi-Fi access point 404d. The Wi-Fi devices 404a and 404b may access either AP 404c or 404d. In the current network architecture, each "G" has a core network. 4G circuit core network 405 includes a 4G MSC/VLR; 4G/3G packet core network 406 includes an SGSN/GGSN (for EDGE or UMTS packet traffic); 3G circuit core 407 includes a 3G MSC/VLR; 4G circuit core 408 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 430, the SMSC 431, PCRF 432, HLR/HSS 433, Authentication, Authorization, and Accounting server (AAA) 434, and IP Multimedia Subsystem (IMS) 435. An HeMS/AAA 436 is present in some cases for use by the 3G UTRAN. The diagram is used to indicate schematically the basic functions of each network as known to one of skill in the art, and is not intended to be exhaustive. For example, 5G core 417 is shown using a single interface to 5G access 416, although in some cases 5G access can be supported using dual connectivity or via a non-standalone deployment architecture.

Noteworthy is that the RANs 401, 402, 403, 404 and 436 rely on specialized core networks 405, 406, 407, 408, 409, 437 but share essential management databases 430, 431, 432, 433, 434, 435, 438. More specifically, for the 2G GERAN, a BSC 401c is required for Abis compatibility with BTS 401b, while for the 3G UTRAN, an RNC 402c is required for Iub compatibility and an FGW 402d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

Figure 5:
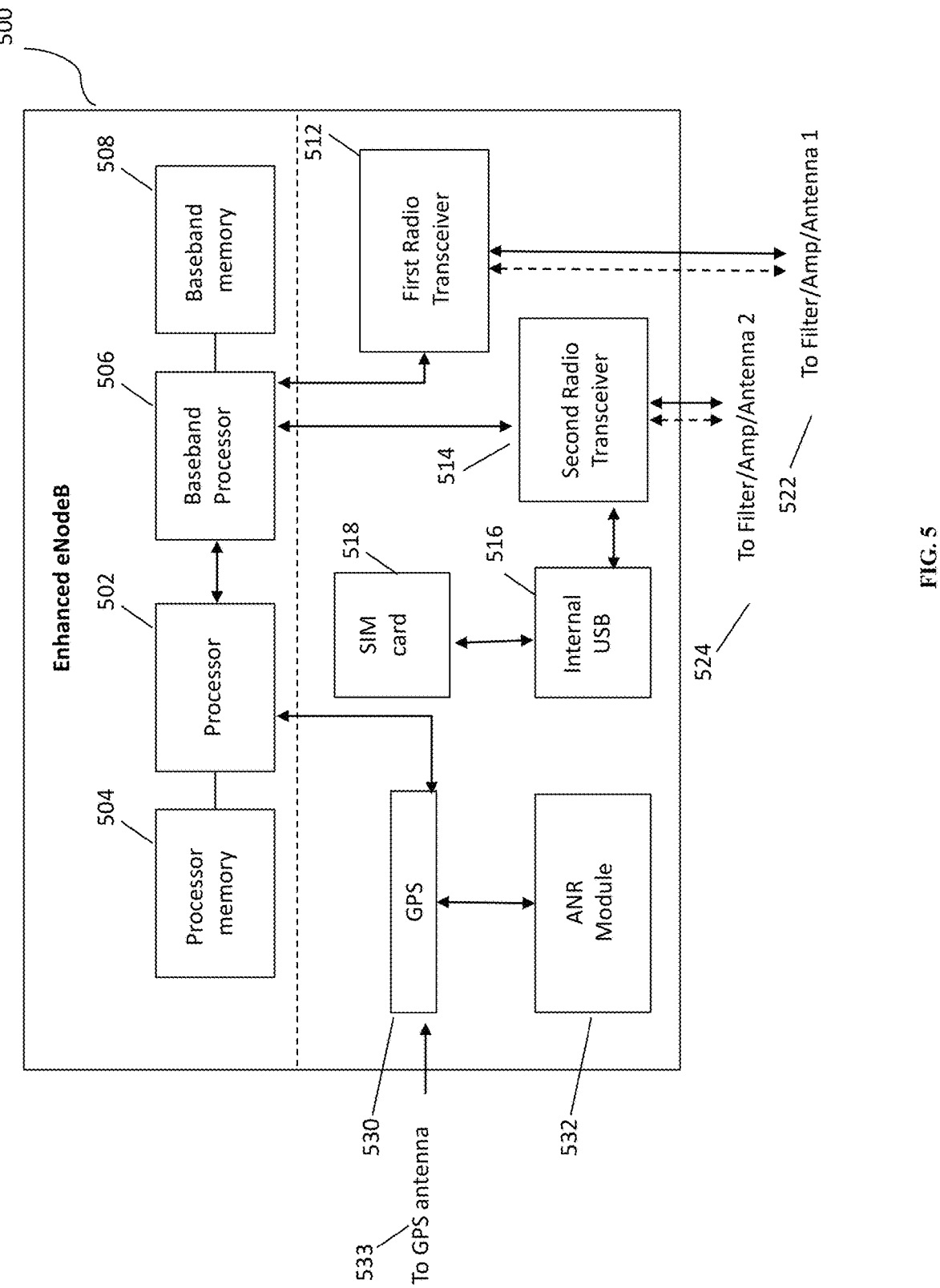
FIG. 5 is an enhanced eNodeB for performing the methods described herein, in accordance with some embodiments.

FIG. 5 is an enhanced eNodeB for performing the methods described herein, in accordance with some embodiments. Mesh network node 500 may include processor 502, processor memory 504 in communication with the processor, baseband processor 506, and baseband processor memory 508 in communication with the baseband processor. Mesh network node 500 may also include first radio transceiver 512 and second radio transceiver 514, internal universal serial bus (USB) port 516, and subscriber information module card (SIM card) 518 coupled to USB port 516. In some embodiments, the second radio transceiver 514 itself may be coupled to USB port 516, and communications from the baseband processor may be passed through USB port 516. The second radio transceiver may be used for wirelessly backhauling eNodeB 500.

Processor 502 and baseband processor 506 are in communication with one another. Processor 502 may perform routing functions, and may determine if/when a switch in network configuration is needed. Baseband processor 506 may generate and receive radio signals for both radio transceivers 512 and 514, based on instructions from processor 502. In some embodiments, processors 502 and 506 may be on the same physical logic board. In other embodiments, they may be on separate logic boards.

Processor 502 may identify the appropriate network configuration, and may perform routing of packets from one network interface to another accordingly. Processor 502 may use memory 504, in particular to store a routing table to be used for routing packets. Baseband processor 506 may perform operations to generate the radio frequency signals for transmission or retransmission by both transceivers 510 and 512. Baseband processor 506 may also perform operations to decode signals received by transceivers 512 and 514. Baseband processor 506 may use memory 508 to perform these tasks.

The first radio transceiver 512 may be a radio transceiver capable of providing LTE eNodeB functionality, and may be capable of higher power and multi-channel OFDMA. The second radio transceiver 514 may be a radio transceiver capable of providing LTE UE functionality. Both transceivers 512 and 514 may be capable of receiving and transmitting on one or more LTE bands. In some embodiments, either or both of transceivers 512 and 514 may be capable of providing both LTE eNodeB and LTE UE functionality. Transceiver 512 may be coupled to processor 502 via a Peripheral Component Interconnect-Express (PCI-E) bus, and/or via a daughtercard. As transceiver 514 is for providing LTE UE functionality, in effect emulating a user equipment, it may be connected via the same or different PCI-E bus, or by a USB bus, and may also be coupled to SIM card 518. First transceiver 512 may be coupled to first radio frequency (RF) chain (filter, amplifier, antenna) 522, and second transceiver 514 may be coupled to second RF chain (filter, amplifier, antenna) 524.

SIM card 518 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 500 is not an ordinary UE but instead is a special UE for providing backhaul to device 500.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 512 and 514, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 502 for reconfiguration.

A GPS module 530 may also be included, and may be in communication with a GPS antenna 532 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 532 may also be present and may run on processor 502 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 6:
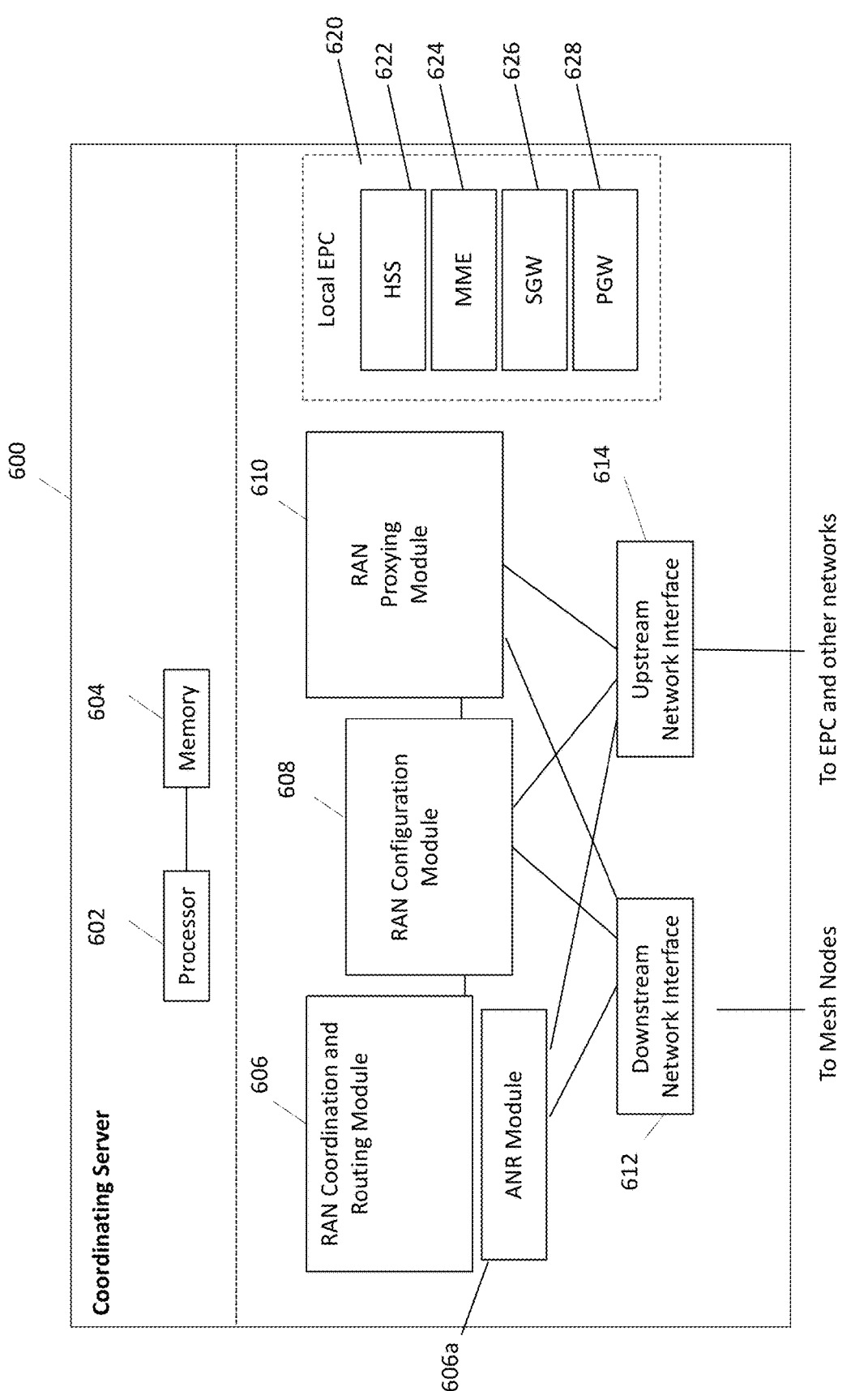
FIG. 6 is a coordinating server for providing services and performing methods as described herein, in accordance with some embodiments.

FIG. 6 is a coordinating server for providing services and performing methods as described herein, in accordance with some embodiments. Coordinating server 600 includes processor 602 and memory 604, which are configured to provide the functions described herein. Also present are radio access network coordination/routing (RAN Coordination and routing) module 606, including ANR module 606a, RAN configuration module 608, and RAN proxying module 610. The ANR module 606a may perform the ANR tracking, PCI disambiguation, ECGI requesting, and GPS coalescing and tracking as described herein, in coordination with RAN coordination module 606 (e.g., for requesting ECGIs, etc.). In some embodiments, coordinating server 600 may coordinate multiple RANs using coordination module 606. In some embodiments, coordination server may also provide proxying, routing virtualization and RAN virtualization, via modules 610 and 608. In some embodiments, a downstream network interface 612 is provided for interfacing with the RANs, which may be a radio interface (e.g., LTE), and an upstream network interface 614 is provided for interfacing with the core network, which may be either a radio interface (e.g., LTE) or a wired interface (e.g., Ethernet).

Coordinator 600 includes local evolved packet core (EPC) module 620, for authenticating users, storing and caching priority profile information, and performing other EPC-dependent functions when no backhaul link is available. Local EPC 620 may include local HSS 622, local MME 624, local SGW 626, and local PGW 628, as well as other modules. Local EPC 620 may incorporate these modules as software modules, processes, or containers. Local EPC 620 may alternatively incorporate these modules as a small number of monolithic software processes. Modules 606, 608, 610 and local EPC 620 may each run on processor 602 or on another processor, or may be located within another device.

In 5GC, the function of the SGW is performed by the SMF and the function of the PGW is performed by the UPF. The inventors have contemplated the use of the disclosed invention in 5GC as well as 5G/NSA and 6G. As applied to 5G/NSA, certain embodiments of the present disclosure operate substantially the same as the embodiments described herein for 6G. As applied to 5GC, certain embodiments of the present disclosure operate substantially the same as the embodiments described herein for 6G, except by providing an N4 communication protocol between the SMF and UPF to provide the functions disclosed herein.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof.

The word "cell" is used herein to denote either the coverage area of any base station, or the base station itself, as appropriate and as would be understood by one having skill in the art. For purposes of the present disclosure, while actual PCIs and ECGIs have values that reflect the public land mobile networks (PLMNs) that the base stations are part of, the values are illustrative and do not reflect any PLMNs nor the actual structure of PCI and ECGI values.

In the above disclosure, it is noted that the terms PCI conflict, PCI confusion, and PCI ambiguity are used to refer to the same or similar concepts and situations, and should be understood to refer to substantially the same situation, in some embodiments. In the above disclosure, it is noted that PCI confusion detection refers to a concept separate from PCI disambiguation, and should be read separately in relation to some embodiments. Power level, as referred to above, may refer to RSSI, RSFP, or any other signal strength indication or parameter.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, 5G, legacy TDD, or other air interfaces used for mobile telephony. 5G core networks that are standalone or non-standalone have been considered by the inventors as supported by the present disclosure.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols including 5G, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to 5G networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for reducing Packet Gateway (PGW) initiated signaling with a Serving Gateway (SGW), comprising:
    determining by the PGW that a Packet Data Network (PDN) is undergoing an S1-handover with an SGW-relocation;
    buffering, by the PGW, a new bearer procedure to be triggered and starting a guard timer; and
    attempting the buffered new bearer procedure when a condition has been met;
    wherein the condition comprises determining the guard timer has expired.

2. The method of claim 1 wherein the PGW initiated signaling with the SGW is General Packet Radio Service (GPRS) Tunneling Protocol Control (GTPC) signaling.

3. The method of claim 1 further comprising initiating, by the PGW, signaling during S1-handover.

4. The method of claim 1 wherein a target SGW is part of a same System Architecture Evolution Gateway (SAEGW) node as the PGW.

5. The method of claim 1 further comprising buffering, by the PGW, bearer procedures that are required to be initiated for a PDN of a User Equipment (UE).

6. The method of claim 1 wherein the condition comprises determining the S1-handover is completed.

7. A system for reducing Packet Gateway (PGW) initiated signaling with a Serving Gateway (SGW), comprising:
    a memory; and
    a processor;
    wherein the memory is configured to, with the processor, cause the system to perform actions comprising:
    a System Architecture Evolution Gateway (SAEGW) node having a target SGW in communication with a PGW;
    wherein the PGW determines that a Packet Data Network (PDN) is undergoing an S1-handover with an SGW-relocation, buffers a new bearer procedure to be triggered messages and starts a guard timer; and
    wherein the buffered new bearer procedure is attempted when a condition has been met;
    wherein the condition comprises determining the guard timer has expired.

8. The system of claim 7 wherein the PGW initiated signaling is General Packet Radio Service (GPRS) Tunneling Protocol Control (GTPC) signaling.

9. The system of claim 7 wherein the PGW initiates signaling during S1-handover.

10. The system of claim 7 wherein the PGW buffers bearer procedures that are required to be initiated for a PDN of a User Equipment (UE).

11. The system of claim 7 wherein the condition comprises determining the S1-handover is completed.

12. A non-transitory computer-readable medium comprising instructions for reducing Packet Gateway (PGW) initiated signaling with a Serving Gateway (SGW) which, when executed, cause a system to perform steps comprising:
    determining by the PGW that a Packet Data Network (PDN) is undergoing an S1-handover with an SGW-relocation;
    buffering, by the PGW, a new bearer procedure to be triggered and starting a guard timer; and
    attempting the buffered new bearer procedure when a condition has been met;
    wherein the condition comprises determining the guard timer has expired.

13. The computer-readable medium of claim 12 further comprising instructions wherein the PGW initiated signaling is General Packet Radio Service (GPRS) Tunneling Protocol Control (GTPC) signaling.

14. The computer-readable medium of claim 12 further comprising instructions wherein the PGW initiates signaling during S1-handover.

15. The computer-readable medium of claim 12 further comprising instructions wherein a target SGW is part of a same System Architecture Evolution Gateway (SAEGW) node as the PGW.

16. The computer-readable medium of claim 12 further comprising instructions, which when executed, cause the PGW to buffer bearer procedures that are required to be initiated for a PDN of a User Equipment (UE).

17. The computer-readable medium of claim 12 further comprising instructions wherein the condition comprises determining the S1-handover is completed.

* * * * *